UNITED STATES PATENT OFFICE.

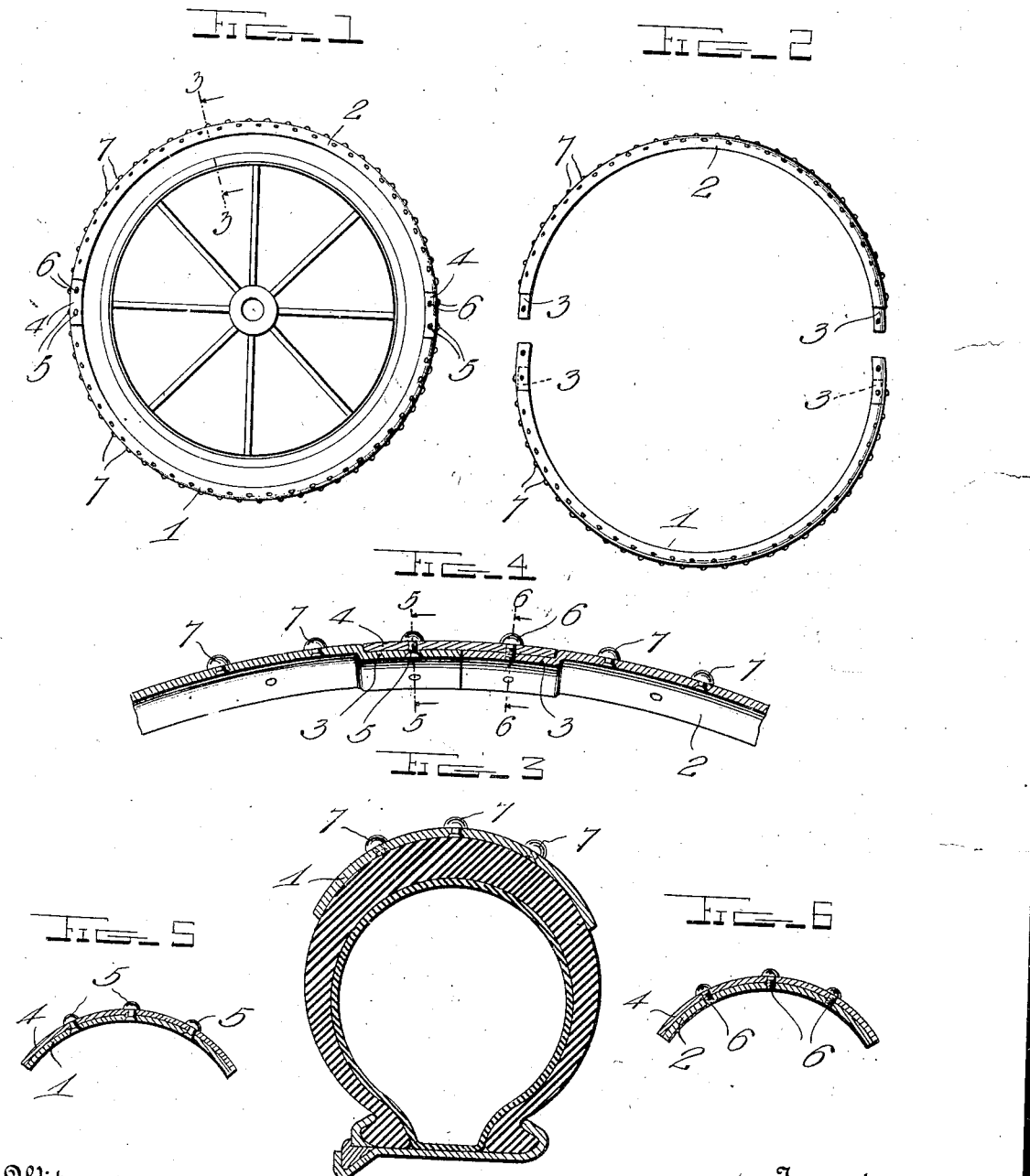

JOHN ROBERT SMITH, OF FLAGSTAFF, ARIZONA.

TIRE-ARMOR.

1,037,677.  Specification of Letters Patent.  Patented Sept. 3, 1912.

Application filed December 7, 1911. Serial No. 664,354.

*To all whom it may concern:*

Be it known that I, JOHN ROBERT SMITH, a citizen of the United States, residing at Flagstaff, in the county of Coconino and State of Arizona, have invented certain new and useful Improvements in Tire-Armors; and I do declare the following to be a full, clear, and exact description of the invention, such as will enable others skilled in the art to which it appertains to make and use the same.

This invention relates to improvements in armors for pneumatic tires.

One object of the invention is to provide a tire armor formed in separable sections whereby the same may be readily engaged with and removed from the tire and which is adapted to firmly grip the outer portion of the tire when the latter is inflated and is thus held against slipping thereon and which will effectually protect the tire against pucture or other injury.

Another object is to provide a tire armor having arranged thereon one or more rows of anti-slipping devices whereby the wheel is prevented from slipping or skidding.

With these and other objects in view, the invention consists of certain novel features of construction and the combination and arrangement of parts as will be more fully described and claimed.

In the accompanying drawings; Figure 1 is a side view of a wheel showing the application of the invention to the tire thereof; Fig. 2 is a side view of the armor showing the sections thereof separated. Fig. 3 is an enlarged cross sectional view through the rim and tire of the wheel and through the armor taken on the line 3—3 of Fig. 1; Fig. 4 is an enlarged longitudinal sectional view through a portion of the meeting ends of the sections of the rim; Fig. 5 is a cross sectional view on the line 5—5 of Fig. 4; Fig. 6 is a similar view on the line 6—6 of Fig. 4.

My improved tire armor is constructed of sheet metal or other suitable material and is formed in two semi-circular sections or strips 1 and 2, said strips being curved transversely to closely fit the curvature of the tread or outer surface of the tire with which the same are engaged and said strips are of sufficient width to extend across the tread of the tire as clearly shown in Fig. 3 of the drawing. The ends of the sections 1 and 2 of the armor are preferably bent inwardly or offset to a slight extent and for a suitable distance back as shown at 3 in Fig. 4 of the drawings, said ends when thus constructed forming a recess or depression at diametrically opposite points in the armor or where the ends of the sections thereof come together. With the recessed ends 3 of the armor sections are engaged splicing or connecting plates 4 which are curved transversely to fit the curvature of the ends of the armor and said plates are rigidly secured to the recessed ends of the section 1 by rivets 5 or similar fastening devices, while the opposite ends of the plates 4 are adjustably secured to the adjoining ends of the armor section 2 by screws 6, said screws being adapted to be readily removed to permit the separation and removal of the armor sections. By thus securing the adjoining ends of the armor sections together a smooth joint is formed on the outer surface of the armor and only a very slight projection on the inner surface thereof.

The outer ends of the rivets 5 and screws 6 for attaching the splicing plates to the ends of the armor sections have formed thereon enlarged heads which, together with a plurality of similarly headed rivets 7 form anti-slipping studs or projections on the outer surface of the armor as shown. The studs 7 are preferably arranged in one or more annular rows around the armor, the latter being shown in this instance and is preferably provided with a central and two outer rows, the studs of said outer rows being arranged opposite the spaces between the studs of the central row except in the case of the studs formed by the rivets 5 and screws 6 which are in transverse alinement. By thus arranging the studs the armor is caused to form a firm grip with the surface of the road thereby preventing the slipping or skidding of the wheel.

The armor is applied and secured in position on the tire in the manner described before the tire is inflated so that when the tire is inflated the latter will be expanded into firm engagement with the inner surface of the armor and depressed ends thereof and will thus securely hold the armor in position and against slipping around on the tire.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

A tire armor comprising a pair of detachable semi-circular, transversely curved armor sections, said sections having correspondingly shaped, inwardly depressed ends extending to the edges of the sections, connecting plates located within the depressed ends of said sections, one end of said plates being rigidly secured to the depressed ends of one section, screws for detachably securing the opposite ends of the plate to the depressed ends of the other section, the inner curved surface of the depressed ends of the sections being adapted to be drawn firmly in contact with the tread of a pneumatic tire and embedded therein whereby the armor is prevented from slipping upon the same, and rows of anti-skidding studs arranged in said sections of the armor and corresponding in shape to the heads of the rivets and screws.

In testimony whereof I have hereunto set my hand in presence of two subscribing witnesses.

JOHN ROBERT SMITH.

Witnesses:
X. N. STEEVES,
J. W. FETTER.